(12) United States Patent
Allman et al.

(10) Patent No.: US 8,255,474 B2
(45) Date of Patent: Aug. 28, 2012

(54) PRUNING METHOD

(75) Inventors: Mark Allman, Southampton (GB); John Anthony Davies, Hants (GB); Gerald Reilly, Whitchurch (GB); Brian John Venn, Eastleigh (GB); Andrew Paul Waters, London (GB); Ewan Victor Withers, Bishops Waltham (GB)

(73) Assignee: International Business Machines Corporation, Armonk, NY (US)

( * ) Notice: Subject to any disclaimer, the term of this patent is extended or adjusted under 35 U.S.C. 154(b) by 1684 days.

(21) Appl. No.: 11/469,543

(22) Filed: Sep. 1, 2006

(65) Prior Publication Data

US 2007/0073804 A1    Mar. 29, 2007

(30) Foreign Application Priority Data

Sep. 3, 2005   (GB) .................................. 0517960.1

(51) Int. Cl.
*G06F 15/16* (2006.01)
(52) U.S. Cl. ........................................ 709/207; 709/203
(58) Field of Classification Search ................... 709/207
See application file for complete search history.

(56) References Cited

U.S. PATENT DOCUMENTS

| | | | |
|---|---|---|---|
| 7,181,438 B1 * | 2/2007 | Szabo | ................................ 1/1 |
| 2002/0078174 A1 | 6/2002 | Sim et al. | |
| 2002/0083118 A1 | 6/2002 | Sim | |
| 2007/0282874 A1 * | 12/2007 | Metcalfe | ....................... 707/101 |

* cited by examiner

*Primary Examiner* — Patrice Winder
*Assistant Examiner* — Tauqir Hussain
(74) *Attorney, Agent, or Firm* — Patents on Demand P.A.; Brian K. Buchheit; Scott M. Garrett

(57) ABSTRACT

In a messaging system, pruning messages from a data store according to similarity of topics and the number of requests for the individual messages and the time intervals between requests of messages of similar topic.

9 Claims, 9 Drawing Sheets

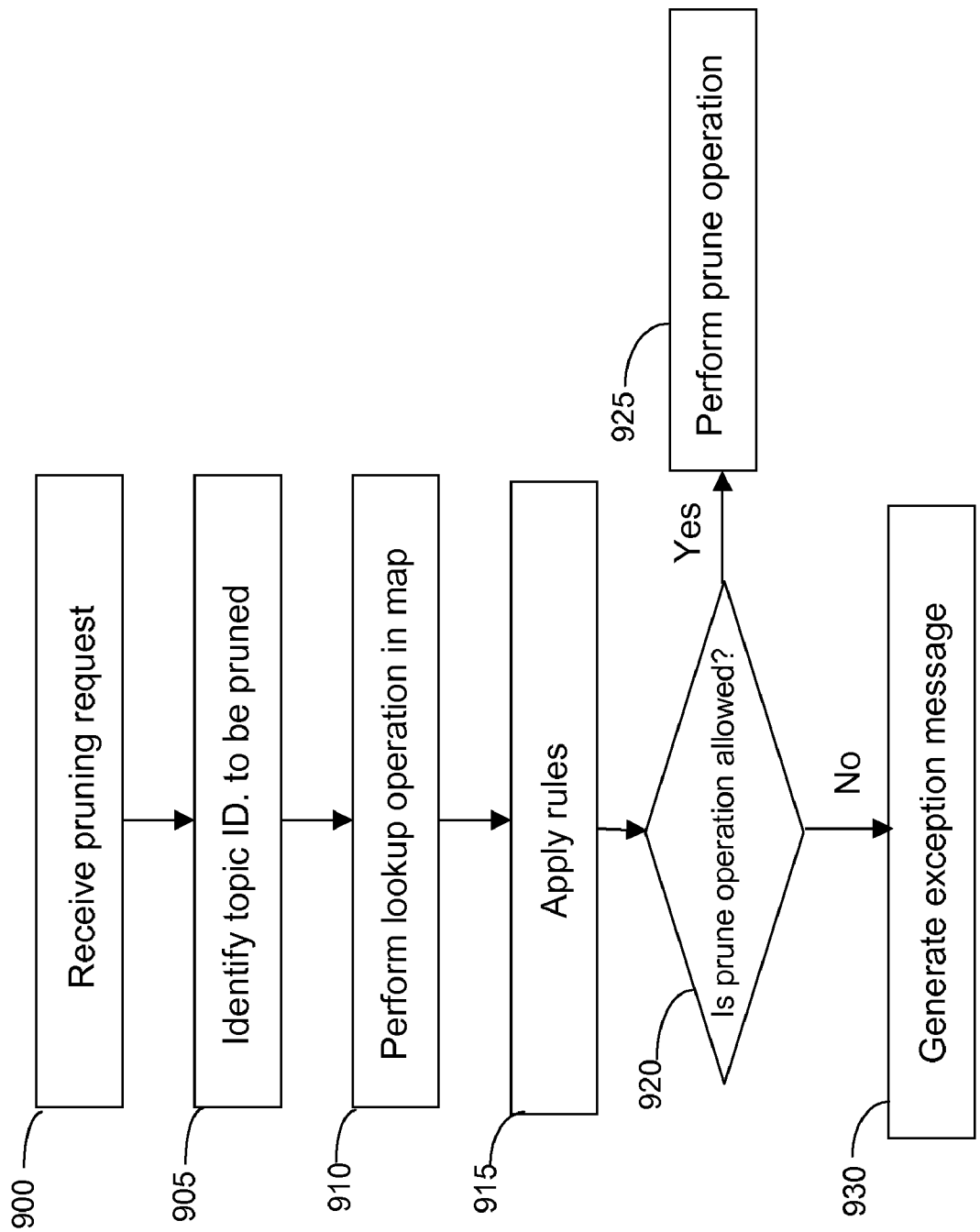

PRUNING METHOD

FIELD OF THE INVENTION

The invention relates to the field of message subscribe systems. In particular the invention relates to a method and system for providing a pruning strategy.

BACKGROUND OF THE INVENTION

Publish/subscribe communications involve information producers publishing information or events to a publish/subscribe system, and information consumers subscribing to particular categories of information or events and receiving relevant publications from the system. The publish/subscribe system may comprise a message broker, located between publisher and subscriber applications, which delivers published information or events to all interested subscribers.

The publish/subscribe communication paradigm supports many-to-many communications in which individual publishers and subscribers may be anonymous to each other (communicating via an intermediate broker) and can be easily added and removed from the network without disruption. An example message broker is the IBM® WebSphere® Business Integration Message Broker product available from IBM. (IBM and WebSphere are registered trademarks of International Business Machines Corporation.)

Many publish/subscribe messaging systems are subject-based. In these systems, each message belongs to one of a predefined set of subjects (also known as channels, or topics). Publishers label each message with a subject, and consumers subscribe to all the messages having a particular subject label. For example, a subject-based publish/subscribe system for stock trading may use a defined topic name for each stock issue—publishers post information using the appropriate topic name and subscribers include topic names when specifying which stocks they wish to receive information about.

Some messaging systems provide a replay feature, for example retaining publications for replay to new subscribers (and newly recovered subscribers) so that the new subscribers are able to receive some or all of an earlier message feed.

In a replay system the messages for replay are stored in a data store. There is a danger, that after a certain period of time, the data store can become over populated with stored messages and thus become difficult to manage. Thus a pruning strategy is deployed by the replay system to provide data management of the data store.

A pruning strategy works by scanning the data store for messages that have been stored for a particular length of time, for example. The length of time is variable and can be altered by an administrator. If the pruning component locates messages that meet the pruning strategy's criterion, a pruning operation is performed and the identified messages are removed from the data store. A problem often occurs when a message is requested for replay, but the request has to be declined because the message has been pruned from the data store. Hence there is a need within the art to provide a solution to this problem.

SUMMARY OF THE INVENTION

Viewed from a first aspect the present invention provides a method for pruning messages, from a data store, in a messaging system, the method comprising the steps of: detecting the number of requests for a message in the data store; determining a rating indicative of the number of detected requests; determining a relationship between the message and other messages stored in the data store; calculating a proximity value from the determined relationship; and in dependence of the rating and the proximity value, determining whether to prune the message from the data store.

Advantageously, the present invention provides a pruning method, product, system and computer program product. The pruning method tracks requests for messages, for replay, from a reply server. A map is created to store a representation of the messages stored in the data store and each time a request is detected the message is flagged as read. For each message requested, the date and time of the request is captured and stored in an activity record. The pruning method uses a rules engine to apply rules to the data to determine a relevance rating for each message requested for replay.

Advantageously, the pruning method detects patterns of activity for each of the messages, for example, the date and time the message was requested and how many times the message has been requested over a period of time. Varying levels of relevance can be determined and different parameters can be applied by the rules to determine the relevance rating. For example, a relevance rating may be determined by calculating the number of times a message has been requested for replay or, for a more complex relevance rating, activity data may be used in combination with the number of times a message has been requested for replay to determine the relevance rating.

The pruning method also detects the proximity of a message to other messages stored in the data store. A proximity strategy is used to understand and determine if a relationship exists between one message and another. For example, a message may have a topic heading 'dogs' and thus messages requested about 'dogs' may also generate interest about 'cats'. Thus the proximity strategy comprises complex rules to determine a number of relationships. Messages determined as having a relationship with another message are flagged in the data store. The total number of messages with a defined relationship to another message comprises the proximity value. Thus, the pruning method determines how relevant a message is to current requests for replay and the relevance the message has to other messages stored in the data store. Therefore when a request to prune the data store is received, the pruning method can determine which messages are currently relevant, i.e. the most requested over a given time period, and which other messages have also been requested for reply because of their relevance to the requested message. It is important to note that the above process is performed over a pre-defined time-cycle and thus a message's relevance and proximity may increase and decrease throughout the time-cycle.

Hence a pruning operation will only prune the messages that have not been requested over a period of time and have no relevance to other messages in the data store.

Viewed from a second embodiment, the present invention provides a pruning component for pruning messages from a data store in a messaging system, the system comprising: a tracking component for detecting the number of requests for a message from the data store; a relevance component for determining a rating indicative of the number of detected requests; a proximity component for determining a relationship between the message and other messages stored in the data store; the proximity component calculating a proximity value from the determined relationship; and a rules engine for determining whether to prune the message from the data store in dependence of the determined rating and the proximity value.

Viewed from a third aspect the present invention provides for a messaging system comprising a pruning component as described above.

Viewed from a fourth aspect the present invention provides a computer program product claim for use with the pruning component as described above.

BRIEF DESCRIPTION OF THE DRAWINGS

Embodiments of the invention are described below in detail, by way of example only, with reference to the accompanying drawings in which:

FIG. 9 is a flow chart detailing the operational steps of the delete component in accordance with a preferred embodiment of the invention.

DETAILED DESCRIPTION OF THE INVENTION

Figure 1:
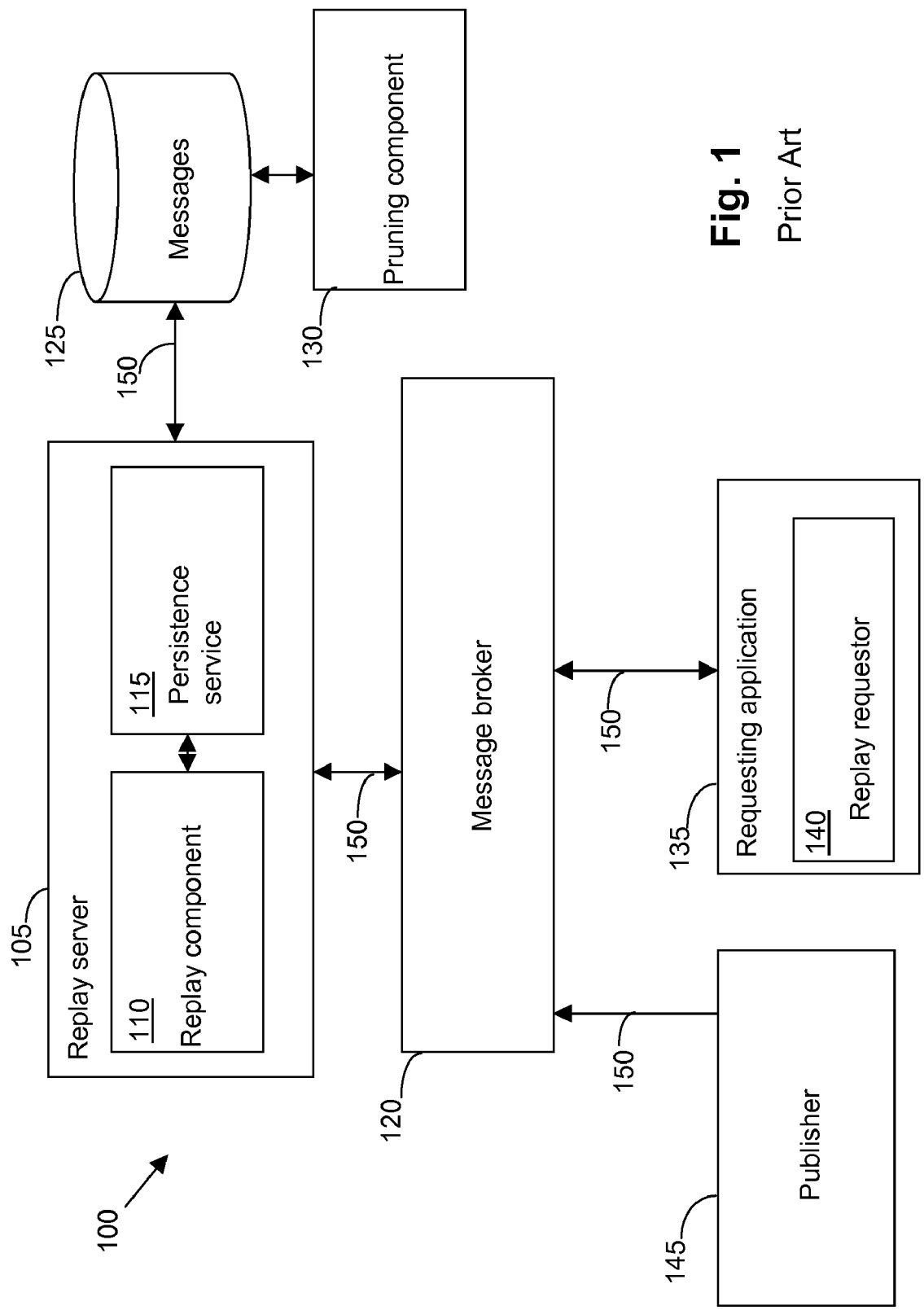
FIG. 1 is a block diagram illustrating a publish/subscribe environment in which the present invention may be embodied.

FIG. 1 illustrates the environment in which the present invention may be embodied in accordance with preferred embodiments. A replay server 105 participates in a messaging environment (for example a pub/sub environment 100) to store a copy of all messages received by a message broker (120) in a message store 125. Note the replay server 105 may be integrated as part of the message broker 120 or may be a separate component (as shown in the figure). In addition to the message store 125, the replay server 105 includes a replay component 110 and a persistence service component 115. The replay server 105 subscribes via a network connection 150 to receive all messages transmitted to the message broker 120.

A requesting application 135 connects to the message broker 120 via the network connection 150. The requesting application 135 comprises a replay requester 140 that is operable to make replay requests via the message broker 120. Upon receipt of such a request, the message broker 120 informs the replay server 105 of the requester's requirements. For example, the replay requester 140 could request a replay of all messages received with a specified time period (e.g. the last hour). Such replay is achieved at the replay server 105 via replay component 110. A publisher 145 connects to the message broker 120 and is operable for transmitting messages to the message broker 120 for storing by the replay server 105.

To manage the many messages that are stored in the message store 125, a pruning component 130 cooperates with the message store and a persistence service 115 to periodically remove messages from the message store 125. The pruning component 130 defines a number of pruning strategies to determine which messages should be removed from the message store 125. For example, the pruning strategy might be to remove all messages from the message store 125 that have been stored for more than 60 days. Thus, the pruning component 130 scans the message store and removes all messages that have been stored in the message store for more than 60 days, regardless if the messages that are being removed are still being requested for replay by the requesting application 135.

Figure 2:
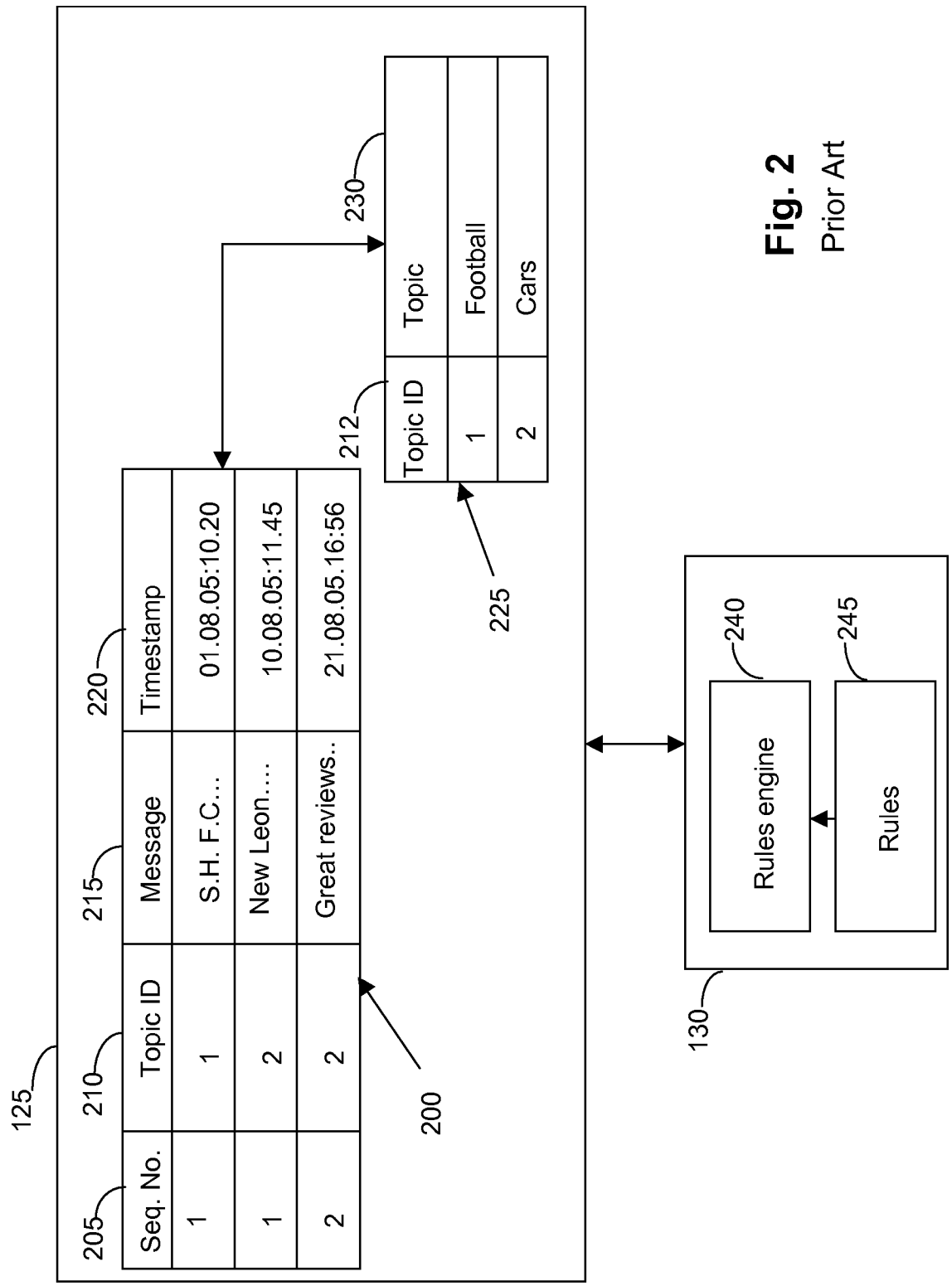
FIG. 2 is a block diagram illustrating how messages are categorized and stored in a publish/subscribe environment as is known in the art.

FIG. 2 illustrates how messages are stored in the message store 125. The message store 125 stores messages received from the message broker 120. Messages are stored in database table 200. Each message is categorised by a topic 230 and is stored and indexed by a sequence number 205. A sequence number 205 is unique for each message within a topic 230. The sequence number 205 is generated and assigned to a message, by the message store 125, on receipt of the message.

In a first database table 225 a number of topics 230 are defined, for example, football and cars. For each defined topic 230, the topic 230 is assigned a topic ID 212. On receiving a new message the message store 125 parses the message to identify the topic i.e. 'cars' and performs a lookup in the database table 225 to identify if the topic exists in the message store 125. If it is determined there is a topic called 'cars', the message is assigned the topic id associated with the topic 'cars'. The message is also assigned a sequence number 205, which is unique for the topic 'cars' and stored in the data store 200 along with the message 215 and a timestamp 220 that indicates the date and time of storage. Alternatively, if a message is received and the message is concerning a topic that does not exist in the message store 125, the topic is added to the data table 225 and assigned a unique topic ID. The process of storing the message proceeds as described above.

Over time the message store 125 becomes populated with a high volume of messages and requires some form of data management. Thus the pruning component 130 cooperates with the message store 125 and the persistence component 115 to prune messages from the message store 125. The pruning component 130 comprises a rules engine 240 and a number of rules 245. The rules 245 comprise logic for a number of pruning strategies. For example, Remove messages that has been stored for a determined period of time;

Remove a percentage of messages that have been stored for a determined period of time; or When the message store 125 has reached a predetermined message limit, remove messages that have been stored for the greatest length of time—hence bringing the number of messages stored below the predetermined message limit.

The rules engine 240 periodically monitors the message store 125 until a characteristic of the message store matches a condition of a pruning strategy rule. Once a match has been identified the rules engine 240 performs the pruning operation. For example, using the data in database table 200 the rules engine 240, for each message, identifies the timestamp field 220, in the database table 200, and determines if the message meets the criterion of being stored for more than fourteen days. Hence if today's date is Aug. 8, 2005, the rules engine 240 identifies the message pertaining to Southampton Football Club 215 (sequence number 1, topic ID 1) as meeting the criterion of the pruning strategy. Hence this message is removed from the message store 125.

As can clearly be seen a situation can arise wherein a request for replay of a message is received and the replay component 110 declines the request because the message has recently been removed from the message store 125.

The present invention overcomes the limitations of current pruning strategies by providing a relevance and proximity component, for intelligently managing the pruning process to ensure that as few replay requests as possible are refused.

Figure 3:
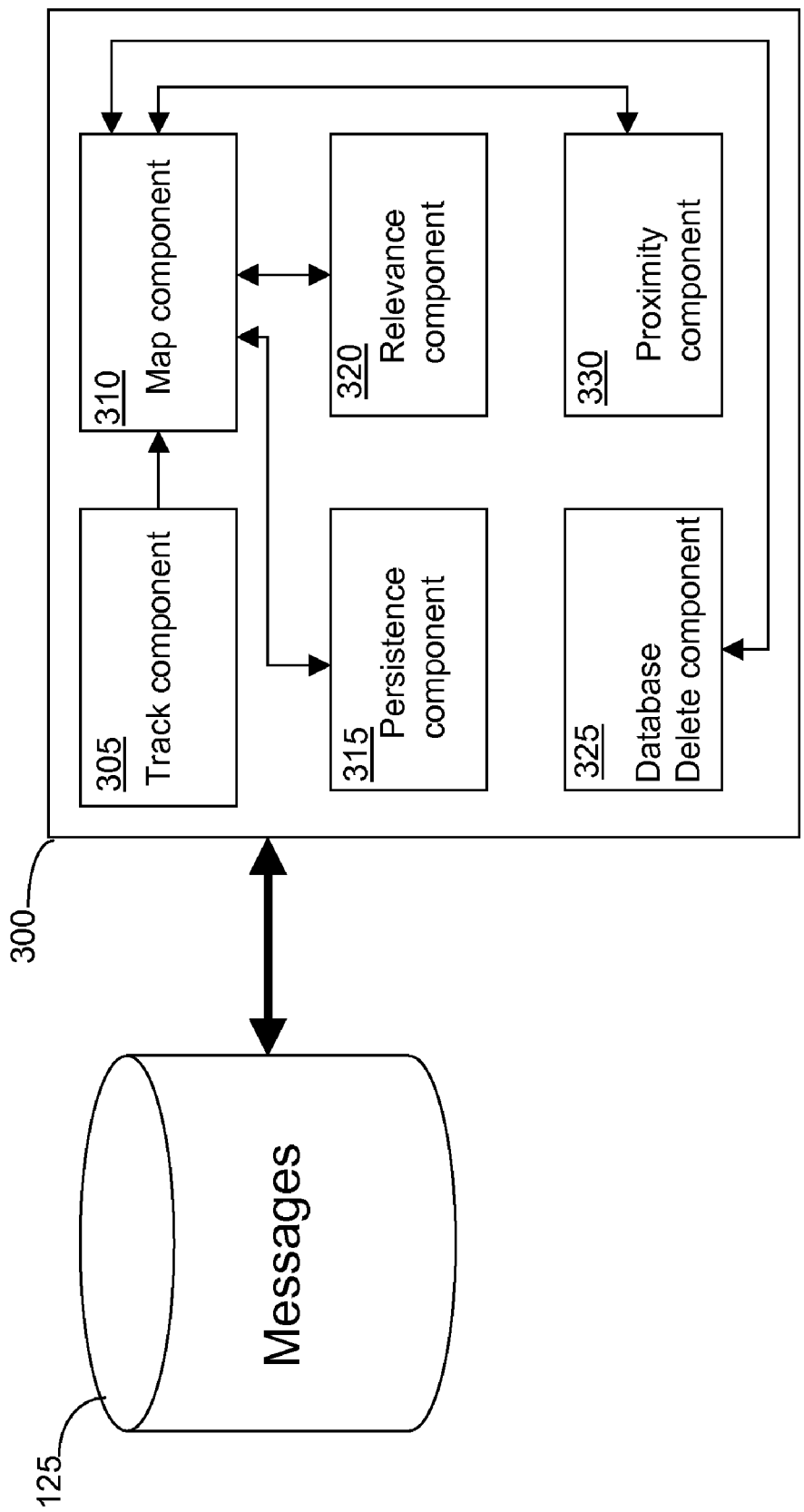
FIG. 3 is a block diagram illustrating a proximity and relevance component in accordance with a preferred embodiment of the present invention.

FIG. 3 illustrates the proximity and relevance component 300 in accordance with a preferred embodiment of the present invention. The proximity and relevance component 300 communicates with the message store 125. The proximity and relevance component 300 in a preferred embodiment is embedded within the message store 125 but as will be understood by a person skilled in the art the proximity and relevance component 300 may be implemented outside of the message store 125 within the replay server 105 or pruning component 130. The proximity and relevance component 300 defines degrees of relevance and proximity for each message in the message store to understand a level of importance of a message and thus whether the pruning component 130 should be allowed to remove the message from the message store or not.

The proximity and relevance component 300 comprises a track component 305, a map component 310, a persistence component 315, a relevance component 320, a database delete component 325 and a proximity component 330. Each of these components will now be explained in turn.

The track component 305 interfaces with the message store 125 to track data reads on a message, for example, a request from the replay component 110 to replay a message. On determining a read operation the track component 305 determines the sequence number and topic id of the message being replayed and packages the data into a data packet for transmitting to a buffer of the map component 310.

Figure 4:
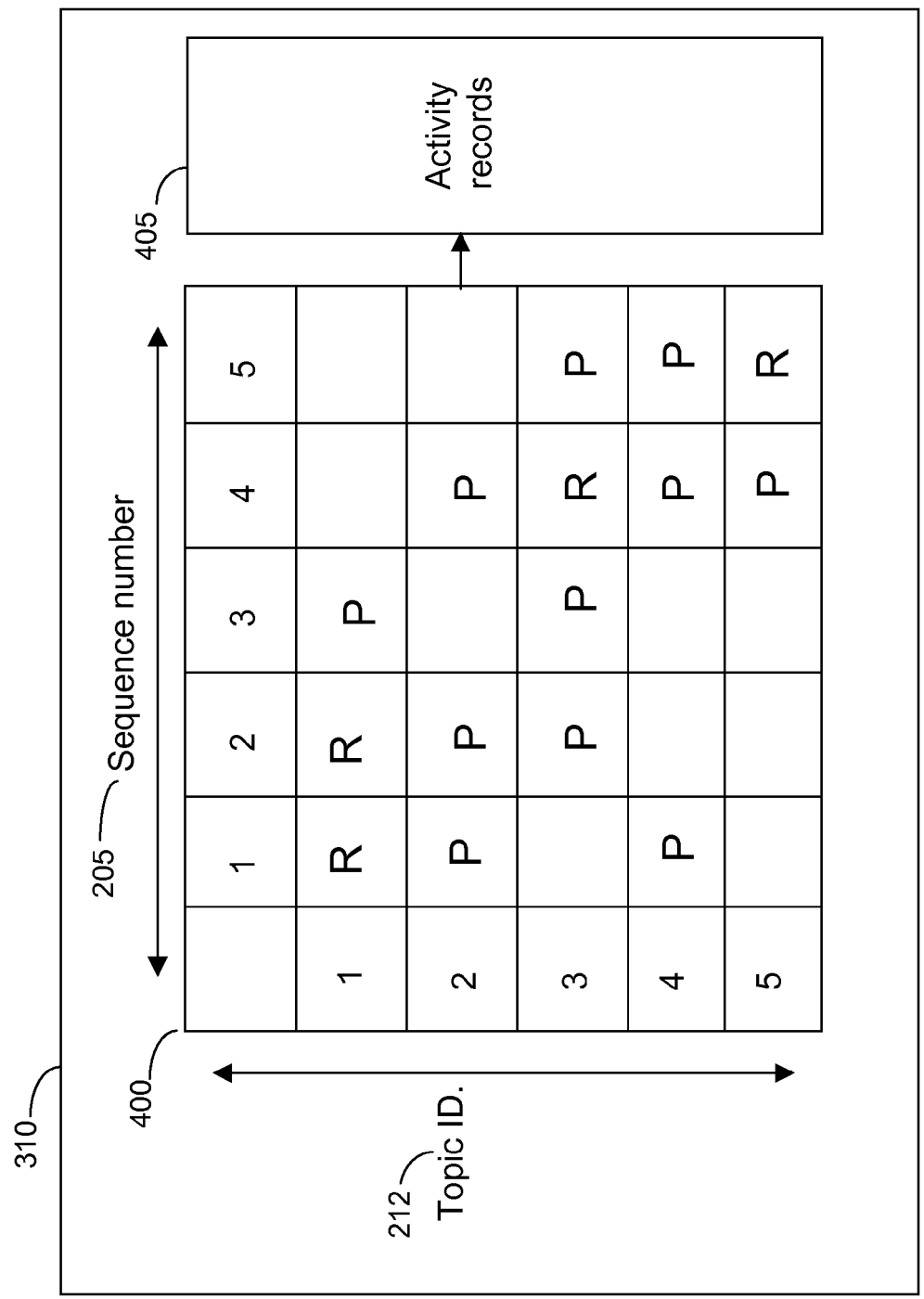
FIG. 4 is a map generated by a map component in accordance with a preferred embodiment of the present invention.

The map component 310 builds and maintains a map 400 of detected read operations for each message stored in the message store 125. With reference to FIG. 4, the map component 310 builds a map of the message store 125. The map in this embodiment comprises a database table 400 comprising columns and rows. The columns represent the sequence number 205 and the rows represent the topic ID 212. The map component 310 requests from the message store the topic ID's and the sequence numbers as stored in database tables 200 and 225. The map component 310 uses this information to populate the map. On receiving a notification of a read operation the map component 310, for example, detects data packets in the buffer and places an identifier in the appropriate column and row to indicate that the message has been read. If a request to replay a message (for example, message: topic id 1, sequence number 1) is made by the message broker 120 to the replay server 105 the replay server 105 requests the message from the message store 125. At this point the track component 305 detects that sequence number 1 topic ID 1 has been read from the message store 125. The track component 305 transmits this information to the map component 310 and the map component 310 identifies the message in its map and marks it as read. This can be seen by referring to topic ID 1 and sequence number 1 in the map of FIG. 4 and noting the notation 'R' in the corresponding box.

The marking of read operations in the map 400 continues for each read operation tracked by the tracking component 305. Thus over a given time period a map 400 of read operations is derived for all replay requests in the message store 125. For example, FIG. 4 shows a detected read operation for sequence number 1 topic ID 1, sequence number 2 topic ID 1, sequence number 4 topic ID 3 and sequence number 5 topic ID 5.

The map component 310 further maintains an activity record 405 for each message requested for replay. Each activity record 405 comprises the date and time of a replay request and a running total of the number of replay requests. An example is shown in Example 1.

EXAMPLE 1

| Sequence number | Topic ID | Timestamp | Total |
|---|---|---|---|
| 1 | 1 | 08.01.05, 10:21 | 2 |
|   |   | 08.01.05, 10:20 |   |
| 1 | 2 | 07.15.05, 15:35 | 3 |
|   |   | 06.29.05, 23:55 |   |
|   |   | 06.29.05, 23:56 |   |
| 2 | 2 |   | 0 |

As can be seen from Example 1, the message associated with sequence number 1 with a topic id of 1 was requested for replay twice—once on the 08.01.05 at 10:20 and again on the same date at 10:21. Likewise, the message associated with sequence number 2 with a topic id of 1 was requested for reply three times—namely once on the 07.01505 at 15:35, secondly on the 06.29.05 at 23:55 and thirdly, on the 06.29.05 at 23:56. Lastly, the message associated with sequence ID 2 and topic ID 2 has not been requested for replay and its total is zero. The activity records 405 are used as input into the database delete component 325 and the relevance component 320.

The proximity and relevance component 300 as previously mentioned comprises a relevance component 320. The relevance component 320 determines the relevance of each message that is identified as read in the map 400, i.e. identified as requested for replay.

Figure 5:
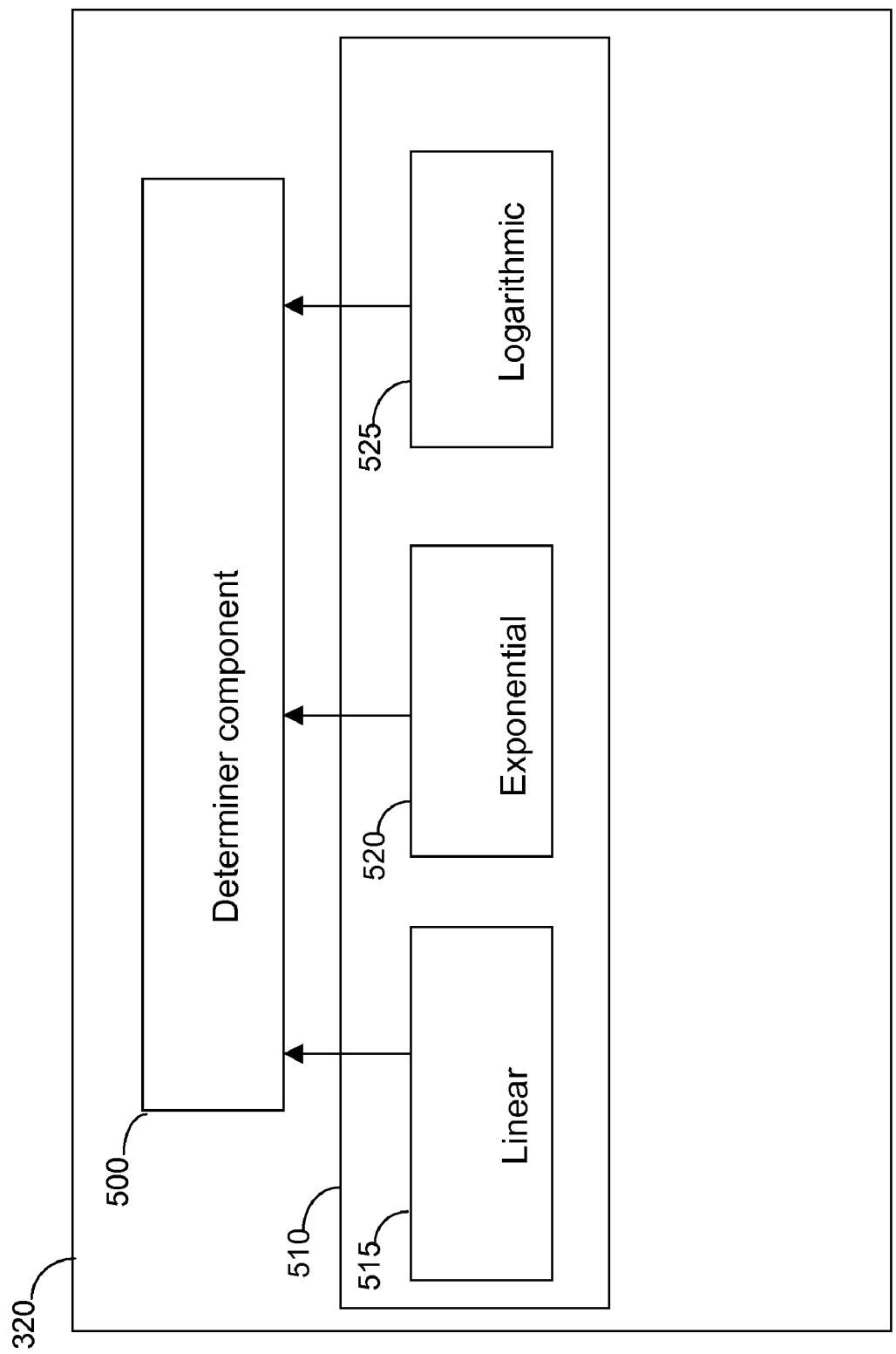
FIG. 5 is a block diagram illustrating the components of the relevance component in accordance with a preferred embodiment of the present invention.

With reference to FIG. 5, the relevance component 320 comprises a determiner component 500, and a degree of relevance model 510. The determiner component 500 interfaces with the map component 310 and the activity records 405, to determine the degree of relevance for each message identified as requested for replay. The determiner component 500 communicates with the relevance model component 510 to deploy one of a set of calculation components. The calculation components may take the form of a linear calculation component 515, an exponential calculation component 520 or a logarithmic calculation component 525. Of course other types of calculations may be deployed. What type of calculation component deployed is dependent on the operational environment of the replay server 105 and can be tailored to suit many different purposes.

The relevance model component 510 determines the degree of relevance by determining the number of times the message has been identified as requested for replay and how recently these requests occurred. Thus the relevance model component 510 via the determiner component 500 requests the activity records 405 of each of the messages identified as requested for replay. Using the data of Example 1, the message associated with sequence number 1 has been requested twice and the message associated with sequence number 2 has been requested three times. But although it would appear that the message associated with sequence number 2 has a higher degree of relevance than the message associated with sequence number 1, the last time the message associated with sequence number 2 was requested for replay was some time before the message associated with sequence number 1. Hence in this case the message associated with sequence number 1 has a higher degree of relevance than the message associated with sequence number 2. Conversely, the message associated with sequence number 3 has no degree of relevance as the message has not been requested for reply. The degree of relevance increases the more the message is requested for replay. Conversely, the degree of relevance decreases as the message is less frequently requested for replay. The decrease in the degree of relevance can either be linear, exponential or logarithmic. The decrease in the degree of relevancy can be arrested or reversed by new replay requests for a message. The degree of relevance is therefore dynamic and changes in a timed cycle of requests.

The level of granularity deployed by the relevance model 510 is dependent on the environment the invention is operating within. For example, the relevance model 510 described above may be suitable for use with a message store 125 that receives a low number of requests each month, but a finer granularity of a relevance model may need to be deployed with a message store 125 storing high volume of messages over a predetermined time limit.

Along with the relevance of a message it is important to determine the proximity of the message in relation to other messages in the message store 125. The degree of proximity is defined by a function of its location in relation to other relevant data (i.e. other messages that have been identified as requested for replay) in the message store 125.

Figure 6:
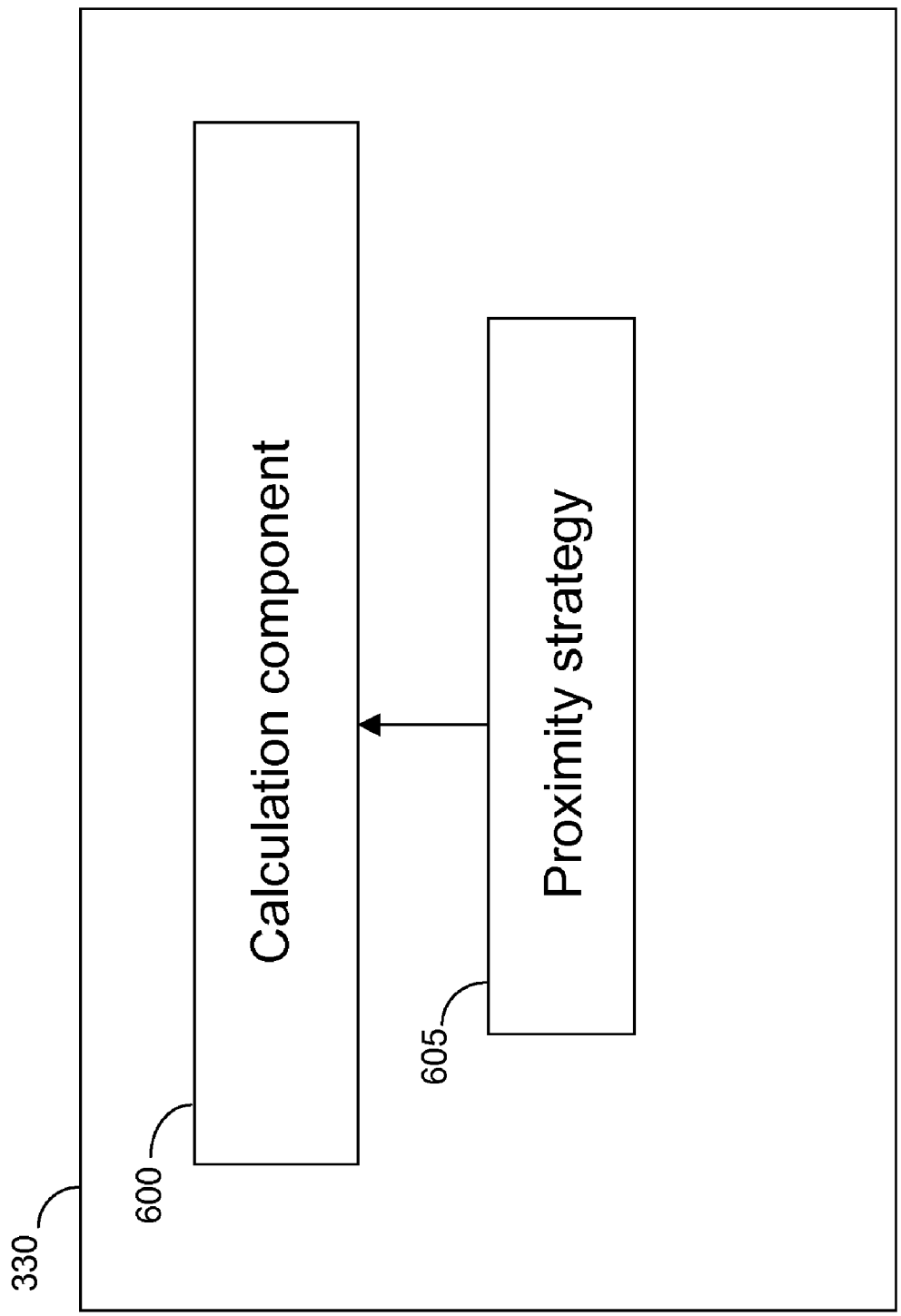
FIG. 6 is a block diagram illustrating the components of the proximity model in accordance with a preferred embodiment of the present invention.

With reference to FIG. 6 the proximity component 330 comprises a calculation component 600 and a number of rules defining a proximity strategy 605. A proximity strategy 605 enables the proximity component 330 to determine which messages should be defined as having a relationship with other messages, in the message store 125. For example, a strategy may define all messages having the same topic have a defined relationship.

The calculation component 600 on trigger from the map component 310 parses the map 400 and for every database row and column that has been logged with a symbol that indicates that the message has been requested for replay, the calculation component logs a further symbol in each surrounding column/row to indicate that that message has a defined relationship.

For example referring to FIG. 4, the map 400 as explained earlier is updated with an 'R' or other symbol that indicates the message has been requested for replay. The proximity component 330 parses the map 400 and puts a further symbol—in this example the character 'P' in each of the surrounding column/row to indicate that the message has a proximity relationship with the message marked with 'R'. For example, the message associated with sequence number 1 and topic id 1 has a read operation recorded against it—identified by an 'R' in the map. The proximity strategy 605 may state for every detected read operation a proximity relationship should be recorded for each column/row before it, behind it and either side of it. In this example, a proximity relationship is recorded in topic ID 2 column/sequence number 1 column. It is not necessary to record a proximity relationship for topic ID 1/sequence number 2 as this already has a read operation recorded. This sequence of operations is continued for each detected read operation until each read operation has a number of proximity relationships associated with it as is shown by the map 400. The blank spaces in the map signify that the message has not been requested for replay and has no defined proximity relationship. These messages, therefore, are candidates for removing from the message store 125.

How the proximity relationships are defined is dependent on the proximity strategy 605. The proximity strategy 605 defines which topics are similar. For example topics about cats also invoke interest in dogs etc and therefore it is advisable not to remove messages about dogs when there are messages about cats etc. The relationships may be defined at many different levels that can be reflected in the map. The relationships may be complex or simple—analogous to the moves of chess pieces on a chess board. For example, for grid reference 2 (sequence number), 2 (topic ID) place a 'P' at grid reference 1,1, 1,2, 1,3, 2,1 and 2,3 etc.

Although the proximity strategy has been described with reference to a two-dimensional database model, it will be understood by a person skilled in the art that the proximity strategy could equally be applied to a three-dimensional or N-dimensional database model.

Once the proximity component 330 has completed the steps of identifying and recording each of the proximity relationships, the proximity component 330 proceeds to determine the degree of proximity by summing the number of proximity relationships for each read operation. The degree of proximity is recorded in the activity record as is shown in Example 2.

EXAMPLE 2

| Sequence number | Topic ID | Timestamp | Degree of relevance | Degree of proximity |
| --- | --- | --- | --- | --- |
| 1 | 1 | 08.01.05, 10:21 08.01.05, 10:20 | 2 | 3 |
| 1 | 2 | 07.15.05, 15:35 06.29.05, 23:55 06.29.05, 23:56 | 3 | 2 |
| 2 | 2 | | 0 | 2 |

Thus it is shown in Example 2 the message associated with sequence 1, topic ID 1 has a degree of relevance of 2 and a degree of proximity of 3. The message associated with sequence number 2, topic ID 1 has a degree of relevance of 3 and a degree of proximity of 2. Lastly, the message associated with sequence number 1, topic id 2 has a degree of relevance of 0 and a degree of proximity of 2. Each of the statistical calculations are analysed by the database delete component 325 to understand whether the message should be pruned from the message store 125.

The database delete component 325 cooperates with the pruning component 130 and the map component 310 to determine whether a prune operation can proceed or not. The database delete component 325 comprises a number of rules that allow the database delete component to interpret the calculated degree of relevance and the degree of proximity as stored in the activity records 405. For any message the following combination of degrees of relevance and proximity can occur:

| Degree of relevance | Degree of proximity |
|---|---|
| High (sum of 10 and over) | High (sum of 10 and over) |
| High | Medium (sum of 5 and over) |
| High | Low (less than 4) |
| Medium (sum of 5 and over) | High |
| Medium | Medium |
| Medium | Low |
| Low (less than 4) | High |
| Low | Medium |
| Low | Low |

Attached to each of the combinations of relevance are rules that state whether the message can be removed from the message store 125 or not. For example, if the degree of relevance is high and the degree of proximity is high the message can not be removed from the message store 125. If the degree of relevance is low and the degree of proximity is low the message can be removed from the message store 125. More complex rules are required to interpret the combinations of relevance in between high and low. For example, it may be advisable to retain any message with a high degree of relevance or a high degree of proximity, but any message with a medium degree of relevance or proximity may be removed from the message store 125.

Figure 7:
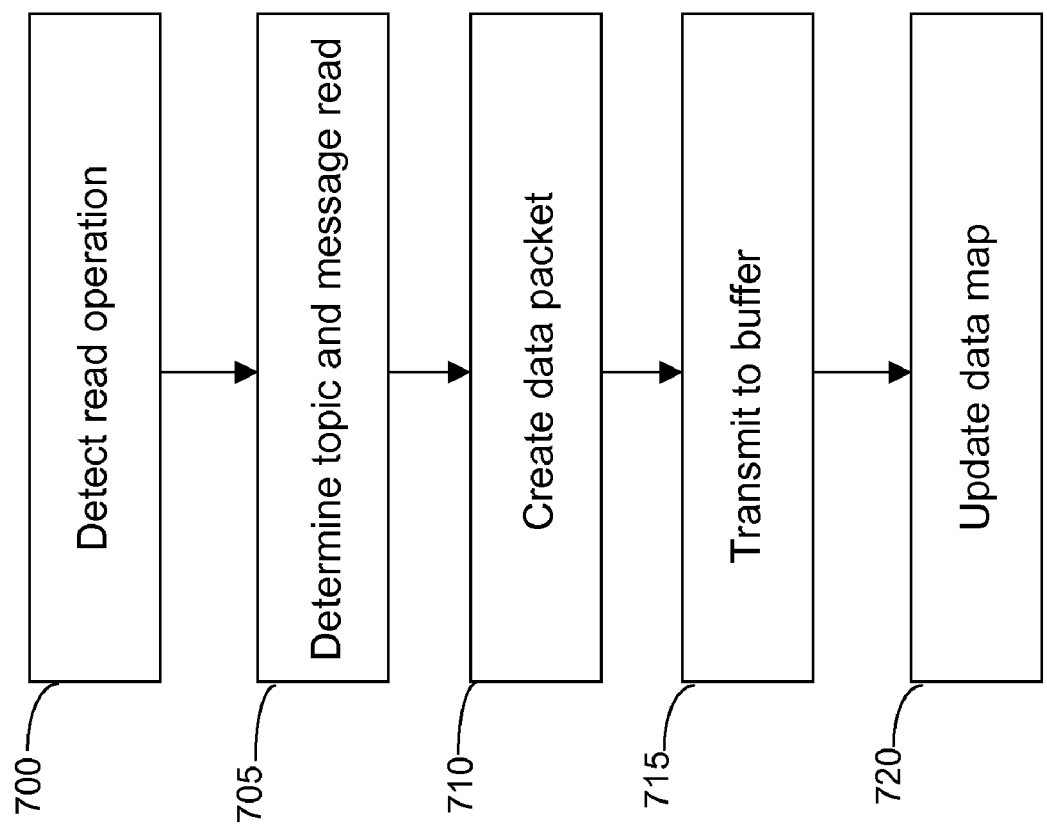
FIG. 7 is a flow chart detailing the operational steps of the map component in accordance with a preferred embodiment of the present invention.

Referring to FIG. 7 the operational steps of the tracking component 305 and map component 310 are shown in use. At step 700, the tracking component 305 detects a request for a message to be replayed. The track component 305 determines the message being replayed, at step 705, and identifies the sequence number and topic id of the message. At step 710, the track component 305 packages the sequence number and topic id into a data packet and submits the data packet to the map component's 310 buffer at step 715. At step 720, the data packet is held in the buffer until the proximity component 330 and relevance component 320 have updated the map 400 and the associated activity records 405. Once the map 400 and the activity records 405 are updated the map component 310 receives the data packet from the buffer. The map component 310 parses the data packet to determine the sequence number and the topic id of the message that is being requested for replay and updates the map and activity record 405 associated with the message.

On updating the map 400 the map component 310 sends a trigger to the relevance component 320 and the proximity component 330 to begin determining the degree of relevance and proximity for each message in the map 400.

Figure 8:
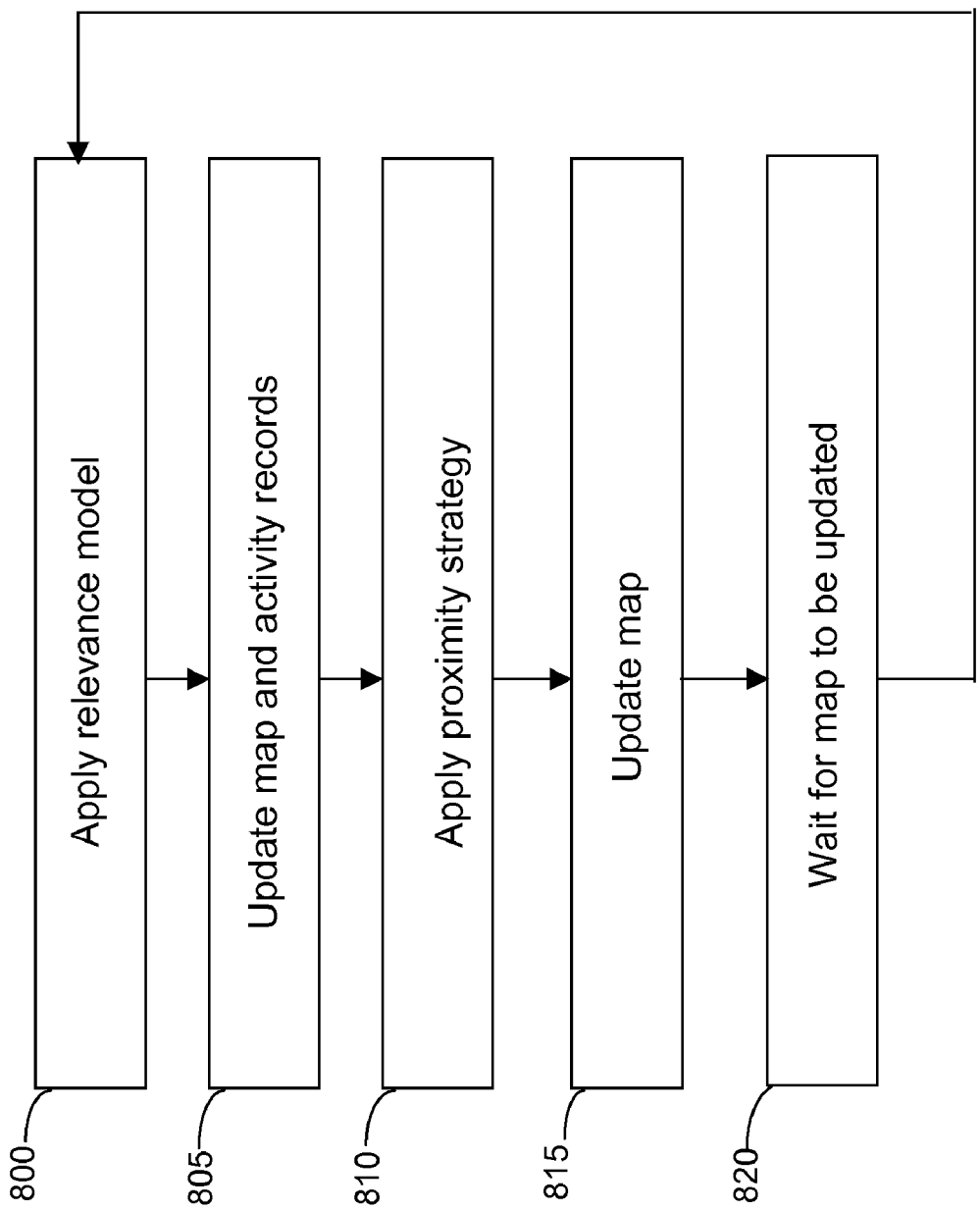
FIG. 8 is a flow chart illustrating the operational steps of the relevance and proximity components in accordance with a preferred embodiment of the present invention.

Referring to FIG. 8 the relevance component 320 begins at step 800 to apply a relevance model to determine the degree of relevance for each recorded read operation in the map 400. The relevance model parses a message's activity record 405 to determine the number of times the messages has been requested to be replayed and in what time period. The degree of relevance for each message is calculated and recorded in its activity record 405, at step 805. At step 810, the proximity component parses the map 400 and determines, based on a proximity strategy, the proximity relationship between a message that has been requested for replay and other messages in the message store 125. The proximity component 330 records the proximity relationships in the map 400 and calculates the degree of proximity that is recorded in the message's activity record 405 at step 815. The proximity component 330 and the relevance component 320 wait until the map component 310 updates the map, with the data packets held in the buffer, before proceeding their calculations again, at step 820.

FIG. 9 shows the database delete component 325 in operation. At step 900, the database delete component 325 receives a pruning request from the pruning component 130. The delete component 325 identifies the topic id and the sequence number of the message to be pruned from the message store 125. The database delete component 325 requests from the map component 310 access to the message's activity record 405 at step 910. The database delete component 325, using a rule set, determines whether the message can be pruned from the message store 125. Control moves to step 915 and the database delete component 325 determines whether the prune operation is allowed. For example, if the activity record 405, for a message, states the message has a high degree of relevance and a high degree of proximity a rule may state the message can not be deleted and control passes to step 930 whereon an exception message is generated and transmitted to the pruning component 130. Alternatively, if the activity record 405 shows the message having a low degree of relevance and a low degree of proximity a rule may state the message can be deleted and control moves to step 925 wherein the prune component is allowed to proceed with its prune operation.

The invention claimed is:

1. A method for pruning messages from a data store in a messaging system, the method comprising:
   by a computing device, executing software code, detecting the number of requests for a message stored in the data store;
   by a computing device, executing software code, determining a rating indicative of the number of detected requests;
   by a computing device, executing software code, determining a relationship between the message and other messages stored in the data store by analysing the topics of the messages and by analysing sequence numbers of messages of similar topics;
   by a computing device, executing software code, calculating a proximity value from the determined relationship; and
   by a computing device, executing software code, in dependence on the rating and the proximity value, determining whether to prune the message from the data store.

2. A method as claimed in claim 1 wherein the step of determining the rating further comprises, identifying when the request was received and in dependence of when the request was received and the number of requests received, assigning a relevance rating to the message.

3. A method as claimed in claim 2 wherein the relevance rating and the proximity value is re-evaluated over a time-cycle, such that the relevance rating for a message increases or decreases.

4. A method as claimed in claim 1, wherein a proximity strategy determines the same or similar topic of interest.

5. A pruning component for pruning messages from a data store in a messaging system, comprising:
   a tracking component, comprising software code able to be executed by a computing device, said software code being stored on a non-transient storage medium, for detecting the number of requests for a message from the data store;
   a relevance component, comprising software code able to be executed by a computing device, said software code being stored on a non-transient storage medium, for determining a rating indicative of the number of detected requests;
   a proximity component, comprising software code able to be executed by a computing device, said software code being stored on a non-transient storage medium, for determining a relationship between the message and other messages stored in the data store by analysing analyses sequence numbers of messages of similar topics and by analysing sequence numbers of messages of similar topics;

the proximity component, comprising software code able to be executed by a computing device, said software code being stored on a non-transient storage medium, calculating a proximity value from the determined relationship; and a rules engine, comprising software code able to be executed by a computing device, said software code being stored on a storage medium, for determining whether to prune the message from the data store in dependence of the determined rating and the proximity value.

6. A pruning component as claimed in claim 5 wherein the relevance component further comprises, a determiner component, for identifying when a request was received and in dependence of when a request was received and the number of requests received, assigning a relevance rating to the message.

7. A pruning component as claimed in claim 6 wherein the relevance rating is re-evaluated over a time-cycle, such that the relevance rating for a message increases or decreases.

8. A pruning component as claimed in claim 5 wherein the proximity component further comprises parsing the data store to determine which other messages are related to the same topics.

9. A messaging system comprising a pruning component, comprising software code able to be executed by a computing device, said software code being stored on a non-transient storage medium, as claimed in claim 5.

* * * * *